United States Patent Office 3,463,451
Patented Aug. 26, 1969

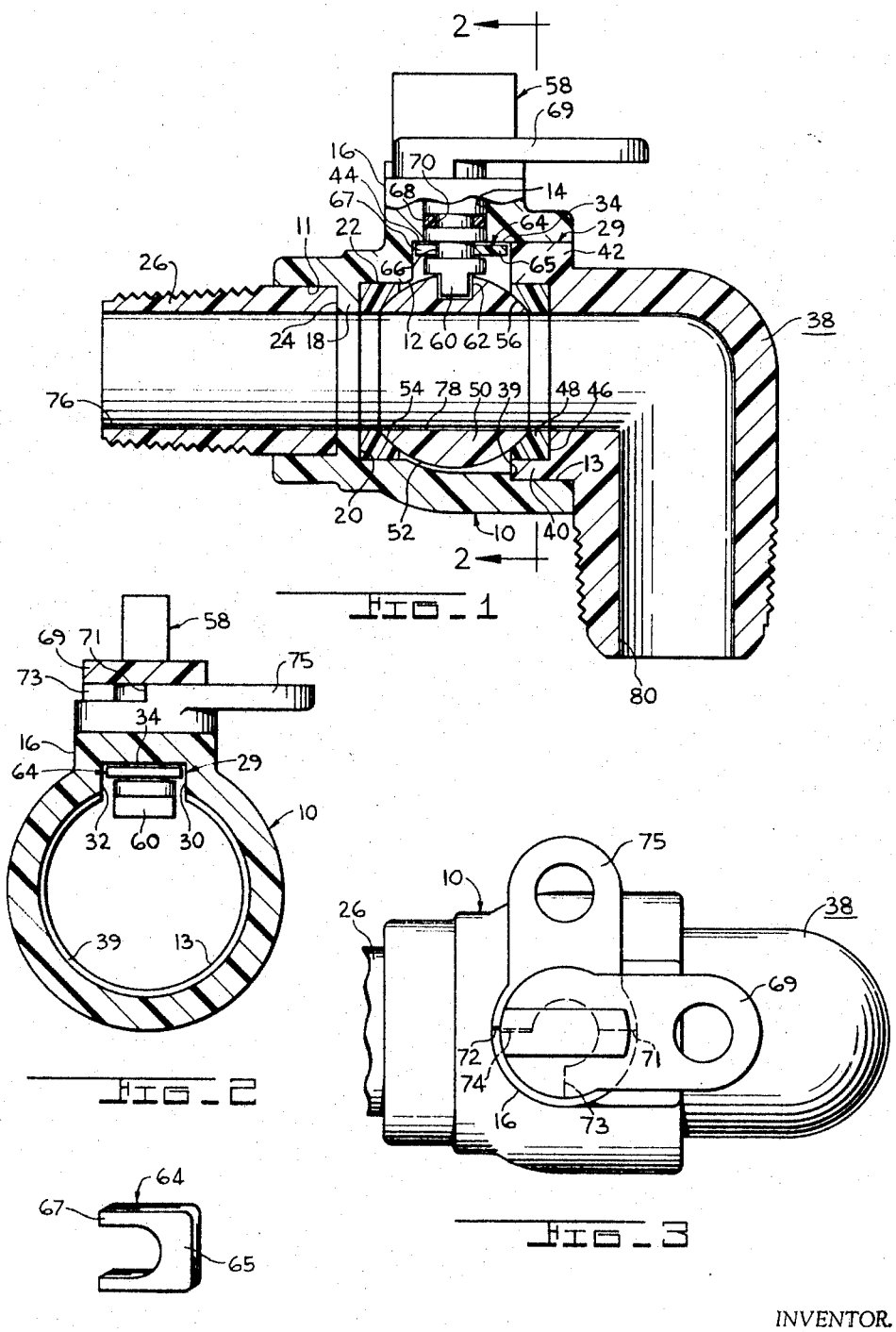

3,463,451
VALVES
Peter A. Treadwell, Hayward, Calif., assignor to Haveg Industries, Inc., Wilmington, Del., a corporation of Delaware
Filed Nov. 20, 1967, Ser. No. 684,312
Int. Cl. F16k *5/06, 25/00, 15/04*
U.S. Cl. 251—315
8 Claims

ABSTRACT OF THE DISCLOSURE

A ball valve comprising a valve housing with a hollow fitting having an outlet passage and having a round end with a radially extending projection received and secured in a round bore and a key slot at one end of the housing. The fitting carries one valve seat surrounding the outlet passage for the ball member while another valve seat for the valve member is on the housing and surrounds an inlet passage. A valve stem extends through a cross-bore and is connected to a ball valve member having a passage therethrough for actuating the same between open and closed positions for communicating or cutting off communication between the hollow fitting and the inlet port. The closed end of a U-clip retainer is located in the key slot and the open end straddles a grooved portion of the stem to hold the stem in operative engagement with the ball valve.

Disclosure

An object of this invention is to provide a valve which can be preferably made of plastic, is properly designed, and is still economical to manufacture.

Other objects will become apparent to those skilled in the art from the following description wherein:

FIGURE 1 is a cross-section of the valve;
FIGURE 2 is a simplified view of the valve housing taken along section line 2—2;
FIGURE 3 is a full plan view of FIGURE 1; and
FIGURE 4 is a view of a clip.

A valve housing 10 has an axial multidiameter bore extending therethrough comprising an inlet end 11, a valve chamber 12, and an outlet end 13.

A cross-bore 14 extends through a boss 16. An annular flange 18 extends into the bore 11 and provides an internal annular shoulder 20 in the chamber 12 for receiving an annular valve seat 22 therein. The outer face of the flange 18 provides an outer shoulder 24 against which a male fitting 26 abuts which is received in the end of the bore 11. A key slot 29 comprises a pair of sidewalls 30, 32, and a wall 34 normal to walls 30 and 32 all of which extend parallel to the axis of the multidiametered bore 11, 12, 13, and from the exterior of the housing 10 beyond the cross-bore 14. The normal wall 34 interconnects one longitudinal edge of each wall 30, 32, and the other edge of each wall 30, 32, is common with the wall of the bore outlet end 13, whereby the slot is an extension of the bore outlet end 13. A right angled male fitting 38 having a round end 40 of the same dimensions as the bore outlet end 13 and a projection 42 of the same cross-section dimension as the slot 29 is received in the bore outlet end 13 and abuts a locator shoulder 39 located in the chamber 12. An annular shoulder 46 is provided on the inner portion of the fitting 38 receiving an annular valve seat 48 therein.

A ball valve 50 is received in chamber 12 between the valve seats 22 and 48. The ball valve 50 and seats 22 and 48 have matching spherical surfaces 52, 54, and 56, respectively, to provide sealing engagement therebetween. A valve stem 58 extends through the cross-bore 14 and the inner portion of the slot 29 and has a rectangular projection 60 extending into a matching slot 62 in the ball. A releasable U-shaped clip retainer 64 has its closed end 65 received in the slot 29 adjacent the normal wall 34 and its open end 67 is received in a groove 66 of the stem 58 and straddles the stem. The retainer clip holds the projection 60 of the stem in the slot 62 and prevents withdrawal of the stem, mainly due to fluid pressure, from the cross-bore 14 while still allowing free rotation thereof. A preferred construction, although not essential, is to allow the open end 67 of the clip 64 to extend beyond the stem and be adjacent to the portion 44 of the wall to provide for more bearing area for the clip 64 for resisting stem withdrawal forces. An O-ring 68 is received in groove 70 of the stem and engages the wall of the cross-bore 14 to seal the interior of the housing from the exterior thereof. A handle 69 is integral with the outer end of the stem 58 for rotation of the stem. Abutments 71 and 72 are spaced 180° apart and are located on a semi-annular segment integral with the boss 16 and are in the path of coacting abutments 73, 74, respectively, spaced 90° apart and located on an arcuate segment integral with the outer end of the stem 58 to limit rotation movement of the stem and thereby the valve to 90° between an open and closed position. A stationary handle 75 is integral with the boss 16 and is provided for locking the handle 69 in closed position. The fitting 26 has an axial passage 76 extending therethrough, the ball valve 50 has an axial passage 78 extending therethrough, and fitting 38 has a right angle passage 80 extending there through. The passages all are of the same diameter. When the ball valve is in the position as shown in FIGURE 1, the passages in the fittings are communicated and when the ball valve 50 is rotated 90°, the communication between the passages in the fittings is cut-off.

As stated above, the valve is preferably made of plastic material. The fittings 26 and 38 are held in their respective bore ends by a solvent cement which fixedly secures the fittings to the housing 10. The fitting 26 is usually secured to the upstream end of the fluid line first and thereafter the fitting 38 is secured to the downstream end of the fluid line. The projection 42 not only acts as a locator for the fitting 38 but also seals the slot 29 from the exterior of the housing. Also due to the tight engagement of the projection 42 with the walls of slot 29, the projection serves to transfer a great portion of the rotational forces exerted on fitting 38 to the walls of the slot 29 whereby the entire rotational force is not resisted entirely by the solvent cement connection between the fitting 38 and housing 10 thereby lessening the chance of breaking the seal therebetween. The fittings may be adapted to be connected to any type of nipples or nuts as may be required and the diameters of any of the passages may be varied in accordance with the requirements of the system in which it is to be used. Also the fitting 38 may be axial rather than angled.

The valve may be assembled in the following manner: The seats 22 and 48 are secured to their respective locations. The ball valve 50 is oriented in the correct position and is inserted into chamber 12. The stem is oriented in a position corresponding with the position of the valve 50 and inserted into the bore 14 with projection 60 mating with slot 62. The retainer clip 64 is then inserted through the slot 29 and connected to the stem to hold it in operative position. A solvent cement is then applied to the end 40 and projection 42 of the fitting 38 and to the bore outlet end 13 and afterwards the fitting is inserted into the bore outlet end 13 until it abuts shoulder 39.

Thus it can be seen that the overall valve assembly, especially the valve stem, is simply assembled with a minimum of special parts which are difficult to mold out of plastic.

I claim:
1. A valve comprising: A housing having a first bore including a valve chamber portion and an end portion opening onto the exterior of said housing, a slot defined by wall means extending in a direction substantially parallel to the axis of said first bore and extending inwardly to said chamber portion from the exterior of said housing, said slot throughout its entire length being in communication with said first bore, a second bore transverse to said first bore and communicating the exterior of said housing with the inner portion of said slot, a fitting having passage means extending therethrough, said fitting having an interior portion extending into said first bore and a lug projecting from said interior portion located in the outer portion of said key slot, said fitting being fixedly and sealingly secured to said housing, a valve seat on said interior portion surrounding said passage means and facing said chamber portion, port means communicating the exterior of said housing with said chamber portion, a valve seat surrounding said port means and facing said chamber portion, a valve member rotatably mounted in said chamber and sealingly engaging said seats, passage means in said valve member for communicating said first named passage means and said port means in an open position of said valve member and for cutting off communication therebetween when said valve member is in a closed position, a valve stem extending through said second bore and through the inner portion of said slot and operatively connected to said valve member for effecting rotational movement of the same into one of said positions, and a releasable retainer member having a portion located in said inner portion of said slot and another portion operably connected to said stem to retain said stem in its operable relationship with said valve member.

2. A valve as recited in claim 1 wherein said stem has an annular groove, said releasable retainer member is a clip, the closed end of which is located in the inner portion of said slot on one side of said bore and the open end of which is located in said groove and straddles said stem.

3. A valve as recited in claim 2 wherein said slot has a portion extending beyond said second bore and said open end of said clip extends beyond said stem and said second bore into said last named portion.

4. A valve as recited in claim 2 wherein said valve member is a ball with axial passage means and said port means and said passage means of said fitting are axially aligned.

5. A valve as recited in claim 1 wherein said end portion of said first named bore is circular, said second named bore is circular and normal to said first named bore, said wall means defining said slot comprises a pair of opposing parallel sidewalls and a wall normal to said sidewall, each wall extending in a direction substantially parallel to the axis of said first bore from the exterior of said housing to at least said second bore, said normal wall interconnecting one edge of each of said sidewalls, the edge opposite said one edge of each sidewall being common with the wall of said first bore.

6. A valve as recited in claim 5 wherein said stem has an annular groove, said releasable retainer member is a clip, the closed end of which is located in the inner portion of said slot and the open end of which is located in said groove and straddles said stem.

7. A valve as recited in claim 6 wherein said valve member is a ball with axial passage means and said port means and said passage means of said fitting are axially aligned.

8. A valve as recited in claim 6 wherein said slot has a portion extending beyond said second bore and said open end of said clip extends beyond said stem and said second bore into said last named portion.

References Cited
UNITED STATES PATENTS

| | | | |
|---|---|---|---|
| 1,447,457 | 3/1923 | Yeiser | 137—329.2 X |
| 2,741,138 | 4/1956 | Russell. | |

M. CARY NELSON, Primary Examiner

M. O. STURM, Assistant Examiner